Patented July 29, 1947

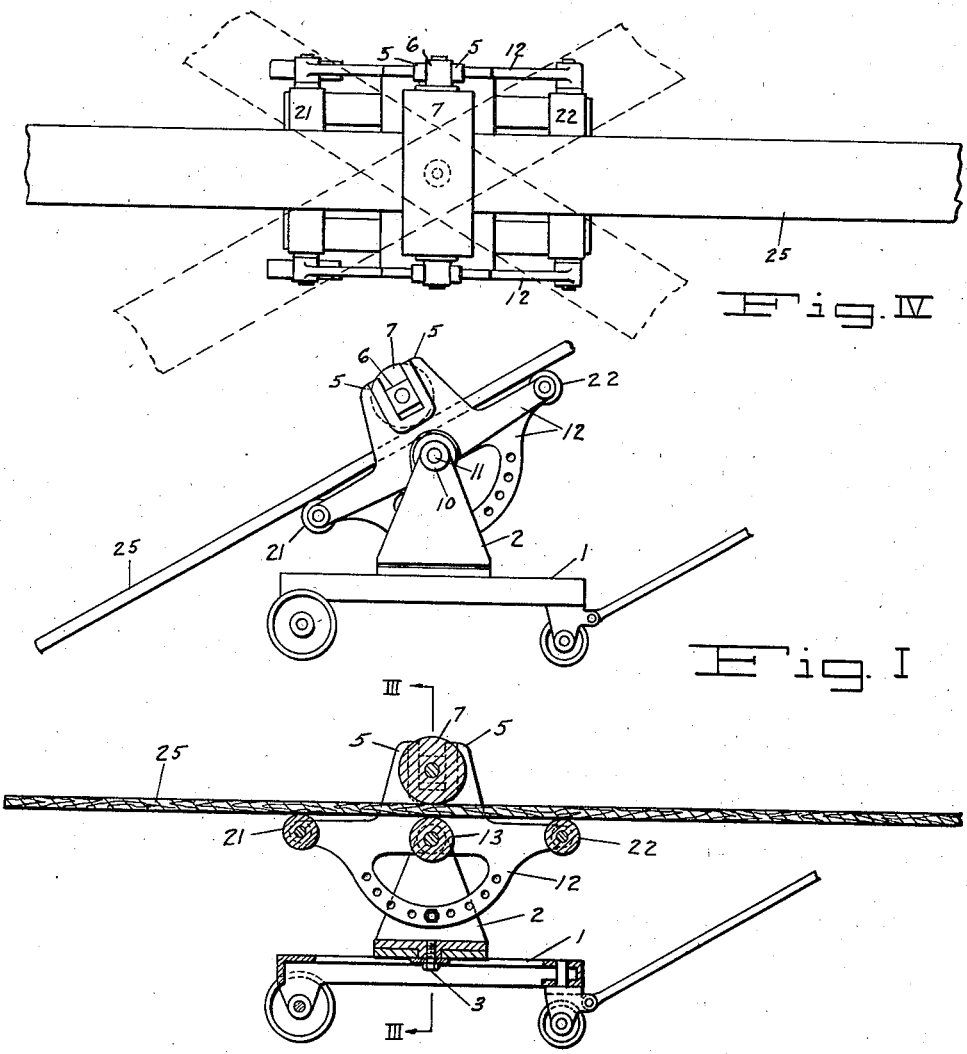

2,424,692

UNITED STATES PATENT OFFICE 2,424,692

LUMBER HANDLING DEVICE

Charles W. Harshberger, Portland, Oreg.

Application July 23, 1945, Serial No. 606,563

6 Claims. (Cl. 214—1)

This invention relates to a lumber handling device that finds a very useful field of employment in loading a car with lumber, hence the drawings have been made to illustrate that application of its usefulness.

It is an object of the invention to supplement human effort with mechanical power in handling lumber, especially when passing lumber from one man to another, as in car-loading, and to do so without the machine having the ability to injure the man on the receiving end, yet having the ability to push a piece of lumber diagonally upwards with sufficient power to carry it where it is going, but will not, in any event, throw the board out.

Let us suppose that the man at the receiving end was not quite ready to take a succeeding board: It is an object of the invention to produce a mechanical aid that will push the board that must wait a bit, within his reach but hold it there until he is ready and afterwards apply full assistance when the inwardly extending end is grasped. This does not sound reasonable but it will now be explained.

In the drawings—

Fig. I shows the handling device with a board part way through it, being a side elevation of the machine;

Fig. II is a longitudinal, sectional elevation of the machine shown in Fig. I, the section being taken on the line II—II of Fig. III;

Fig. III is a cross section of Fig. II on the line III—III in that figure; and

Fig. IV is a plan of Fig. II with the addition of dotted lines indicating flexibility of the handling device.

All of the views show the machine proper mounted on a hand truck which is only one of the many available mountings, as will be explained.

Essentially the base 1, supports a turret 2, which is bifurcated as shown in Figs. III and IV, pivotally mounted at 3, on the base 1, so that it will swing through a full circle. The turret 2, includes a pair of shaft bearings 10, within which is journaled the roller shaft 11, which concurrently serves as two pivot seats for the lumber carriage 12. Mounted on the shaft 11 and made rigid therewith is a revoluble roller 13, which is a live roll under the influence of the electric motor 15, its built-in reduction gear 16 and the belt 17 with the grooved pulleys 18 and 19 the latter of which will be made tight on the shaft 11.

The lumber carriage 12, carries three other rollers, besides the live roll 13, but as will be noted none have power applied save indirectly by handling a board. Two of them, 21 and 22, will have their upper longitudinal surfaces in the same plane as the live roll 13, so that a board resting on all three will be propelled when the machine is level by influence of the live roll and especially by the presence of the relatively heavy traction roll 7, that rests slidably by its journal boxes 6 within the two pairs of jaws 5, which form a superstructure portion of the lumber carrier generally indicated by the numeral 12.

It will now be assumed that the lumber handling device is sitting on its base 1, and the latter is properly stationed in a car door or on something else that brings its scope of activity within loading range of a car to be loaded with lumber. The outside man picks up a board such as 25 and inserts its end between the rollers 7 and 13. The machine takes hold and the board progresses aboard the car. If the inside man or car loader is ready to receive it, he takes delivery and that is all there is to it; but if not quite ready, the board finally gets to where its long end overbalances its short end plus the applied weight of the roller 7, and traction from the revolving roller 13, ceases to have ability to propel the board, which stops where it is. A second or two later, we assume that the loader turns from his work, finds the end of the board near, lifts it up slightly and forward it comes, the motor assisting to get it aboard until the end passes from between the rollers 7 and 13, but the roller 22, will give the board a roller bearing for another foot or so. Meantime, the workman was in no danger of being rammed by the incoming plank that he was unready to receive and the other or outside man could be getting a succeeding board ready.

By constructing the roll 7 or traction roll larger in diameter than the live roll 13, the man feeding a board to the machine can easily employ the end of the board as a pry and the roll 21 or 22 as the case may be, as a fulcrum, thus easily entering a board between the live and traction rolls.

The machine is preferably provided with means such as the segment with the holes and removable pin, but this device is so widely used in other machines that it is not deemed necessary to explain it.

Having fully disclosed my invention so that those familiar with lumber handling can appreciate it and make it and use it, what I claim as new and desire to secure by Letters Patent is:

1. In a lumber handling device, a plurality of rolls comprising a pair of spaced free running rolls and a motor driven roll therebetween, the upper surfaces of said rolls in the same plane, and a traction roll liftably, revolubly mounted above the driven roll and the free running rolls, the said traction roll mounted yieldable to overbalancing of a board therebeneath to cancel propulsive effect of said motor driven roll when moving a board.

2. A lumber handling device for mechanically moving one board at a time comprising a turret mounted lumber carriage, within which are mounted a plurality of rollers in a common plane arranged for the propulsion of a board thereover, the center one of the rollers being power driven, and a traction roller liftably, revolubly mounted above the plane of the first named rollers and arranged to apply its weight to a board passing over the said first named rollers to induce traction being applied to the board, the said rollers so positioned with respect to the direction of lumber travel that when the board overbalances the traction roller, the board stops.

3. In a lumber handling device, a turret mounted lumber carriage, a live roll and a plurality of free running rolls comprising a lumber traverse surface thereover, with a traction roller over the live roll mounted for revoluble and up and down motion, to apply traction pressure to a board against the live roll when the board is inserted therebetween and to yield to the board when it passes to overbalancing position, thus stopping the travel of the board.

4. A lumber handling machine comprising a base, a lumber carrier mounted on said base and swingable in both horizontal and vertical planes, the lumber carrier surface comprising a live roll, a vertically liftable loaded traction roll superposed thereabove and adapted to apply traction contact with the live roll to a board therebetween, and lateral free running rolls spaced on each side of the said live roll with their upper surfaces in the same plane as the live roll.

5. A lumber handling device comprising a base, a turret mounted on the base, a lumber carrier swingable in a vertical plane and mounted on the turret, said lumber carrier comprising a plurality of rolls in a common plane one of which is a power driven roll, and means comprising a yieldably mounted traction roll free running in a plane above the power driven roll effective to induce tractive effort between the power driven roll and a board between the last two named rolls while the total load is preponderantly on the power driven roll, said traction roll yieldable to overbalance of a board as the center of weight passes beyond said traction roll.

6. A power lumber handler comprising a base, a turret revolubly mounted to turn in a plane parallel to said base, a lumber carrier pivotally mounted on said turret to swing in a plane normal to the plane of the base, said carrier comprising a frame, a plurality of rollers journaled within said frame comprising a power roller, a yieldable traction roller and spaced support roller means free to revolve by friction of a piece of lumber moving thereover; the said traction roller effective to cancel the power of the power roller to move a board when it is lifted by overbalancing of the board.

CHARLES W. HARSHBERGER.

REFERENCES CITED

The following references are of record in the file of this patent:

UNITED STATES PATENTS

| Number | Name | Date |
| --- | --- | --- |
| 435,891 | Goldsmith | Sept. 2, 1890 |
| 814,105 | Williams | Mar. 6, 1906 |
| 1,045,529 | Davis | Nov. 26, 1912 |
| 1,351,777 | McDonough | Sept. 7, 1920 |
| 1,450,571 | Allen | Apr. 3, 1923 |
| 1,702,185 | Weber | Feb. 12, 1929 |
| 2,382,491 | Loftus | Aug. 14, 1945 |